United States Patent
Suzuyama et al.

(10) Patent No.: US 8,139,584 B2
(45) Date of Patent: Mar. 20, 2012

(54) FRAME TRANSMISSION DEVICE AND LOOP JUDGING METHOD

(75) Inventors: Shigeru Suzuyama, Fukuoka (JP); Hiroki Hamachi, Fukuoka (JP); Daisuke Nagai, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 12/369,971

(22) Filed: Feb. 12, 2009

(65) Prior Publication Data

US 2009/0207742 A1 Aug. 20, 2009

(30) Foreign Application Priority Data

Feb. 15, 2008 (JP) ................................. 2008-035110

(51) Int. Cl.
*H04L 12/28* (2006.01)

(52) U.S. Cl. ... 370/392; 370/397; 370/399; 370/395.31; 370/401; 370/409; 709/223; 709/249

(58) Field of Classification Search .......... 370/254–257, 370/368, 374, 389, 392, 397–399, 395.31, 370/395.4, 395.53, 395.7, 395.71, 401, 402, 370/409, 413, 419–422, 428, 429, 471, 476, 370/477; 709/223, 224, 238, 243, 244, 249, 709/253

See application file for complete search history.

(56) References Cited

U.S. PATENT DOCUMENTS

| | | | | |
|---|---|---|---|---|
| 5,884,036 A | * | 3/1999 | Haley | 709/224 |
| 6,104,696 A | * | 8/2000 | Kadambi et al. | 370/392 |
| 6,167,051 A | * | 12/2000 | Nagami et al. | 370/397 |
| 6,363,068 B1 | * | 3/2002 | Kinoshita | 370/389 |
| 6,810,021 B1 | * | 10/2004 | Sakurai | 370/255 |
| 7,225,269 B2 | * | 5/2007 | Watanabe | 709/238 |
| 2006/0126517 A1 | | 6/2006 | Kurosaki et al. | |
| 2008/0267081 A1 | * | 10/2008 | Roeck | 370/401 |
| 2009/0109972 A1 | * | 4/2009 | Chen | 370/392 |

FOREIGN PATENT DOCUMENTS

JP 2006-173785 A 6/2006

* cited by examiner

*Primary Examiner* — Jeffrey M Rutkowski
(74) *Attorney, Agent, or Firm* — Fujitsu Patent Center

(57) ABSTRACT

A frame transmission device having a port for transmitting and receiving a frame and a learning table for storing a transmission source address included in the frame received at the port and the receiving port in association with each other includes: a port detector for detecting whether learning data coincident with the transmission source address included in the frame received at the port is stored in the learning table; a port judging unit for comparing a port learned in the learning data detected by the port detector to the receiving port; and a loop judging unit for judging on the basis of a time lapse from the storage of the learning data whether the frame is in a loop or not when the port learned in the learning data is not coincident with the receiving port.

3 Claims, 11 Drawing Sheets

FIG. 4

| PORT IDENTIFICATION INFORMATION | MAC ADDRESS | AGING TIMER |
|---|---|---|
| 1 | MAC-A | 300 SECONDS |
| 3 | MAC-B | 100 SECONDS |
| ... | ... | ... |

| PORT IDENTIFICATION INFORMATION | MAC ADDRESS | FRAME DISCARD TIME |
|---|---|---|
| 4 | MAC-A | 10 HOUR 00 MINUTE 00 SECOND |
| ... | ... | ... |

120

FRAME TRANSMISSION DEVICE AND LOOP JUDGING METHOD

CROSS-REFERENCE TO RELATED APPLICATIONS

This application is based upon and claims the benefit of priority of the prior Japanese Patent Application No. 2008-35110, filed on Feb. 15, 2008, the entire contents of which are incorporated herein by reference.

FIELD

The present invention relates to a frame transmission device having plural ports for transmitting/receiving frames.

BACKGROUND

Recently, wide-area Ethernet has been introduced in place of IP-VPN (Virtual Private Network) for the purpose of suppressing equipment costs when an intranet is architected. An L2 (layer 2) switch used when the wide-area Ethernet is architected has a MAC (media Access Control) learning function, and executes frame transmission.

Here, according to the MAC learning function in the L2 switch, "MAC address of transmission source" and "reception port" of a frame received by the L2 switch are stored as a pair in an FDB (Forwarding Database), and when a frame having a MAC address stored in the FDB as a destination is received from another port, the frame is not transmitted to all the ports, but the frame is transmitted to only learned ports, thereby canceling needless traffic.

Furthermore, the MAC learning function has an aging function. According to this aging function, when the L2 switch has not received a frame having a learned MAC address of transmission source within a fixed time, it is assumed that no communication is executed, and thus an entry is deleted from the FDB. A timer for executing countdown while no frame is received is called an "aging timer." The L2 switch resets the corresponding aging timer to the maximum value every time a frame having learned a "MAC address of transmission source" is received.

FIG. 10 is a diagram illustrating the MAC learning function in the conventional L2 switch. As illustrated in FIG. 10, the L2 switch 50 has ports 1 to 4 and FDB 50a. The ports 1, 2 are connected to an L2 network 20, and the ports 3 and 4 are connected to an L2 network 30. The port identification information of each of the ports 1 to 4 is set to "1" to "4" respectively.

For example, when the L2 switch 50 receives a frame of a terminal 10a (the MAC address of the terminal 10a is represented by "MAC-A") from the port 1, the port identification information "1", the MAC address "MAC-A", and the value of the aging timer are stored in FDB 50 in association with one another. When the L2 switch 50 receives a frame addressed to the terminal 10a from L2 network 30 in a state that an entry as described above is stored in FDB 50a, the L2 switch 50 transmits the frame from the port 1.

Thereafter, when the terminal 10a moves and the L2 switch 50 receives the frame from the terminal 10a through the port 2, the port identification information corresponding to the MAC address "MAC-A" is set to "2" and the aging timer is set to "300 seconds", thereby updating FDB 50a (the maximum value of the aging timer is set to 300 seconds).

In the L2 networks 20 and 30, a frame may be looped when a connection miss, a device bug, or the like occurs. FIG. 11 is a diagram illustrating a problem caused by the looping of a frame. In FIG. 11, the MAC address of the terminal 10a is represented by "MAC-A", and the MAC address of the terminal 10b is represented by "MAC-B".

As illustrated in FIG. 11, the L2 switch 50 obtains a frame (the MAC address "MAC-A" of a transmission source, the MAC address "MAC-B" of the transmission destination) from the port 1, determines that the transmission port of the frame is port 3 on the basis of the FDB 50a, and transmits the frame from the port 3. Thereafter, when the frame is looped through the network 30 and returned to the port 4 of the L2 switch 50, the L2 switch 50 assumes that the terminal 10a moves (although the terminal 10a does not actually move) and updates FDB 50a (the port identification information corresponding to the MAC address "MAC-A" is updated from "1" to "4").

As described above, when the L2 switch 50 updates the FDB 50a, the frame is transmitted from the port 4 to the port 3 again because the address of the transmission source is set to "MAC-B", so that the frame is permanently looped between the port 3 and the port 4.

Furthermore, when the L2 switch 50 receives a frame addressed to the terminal 10a in the state that the FDB 50a is erroneously updated, the frame cannot be properly transmitted to the terminal 10a. Accordingly, in order to overcome the problem illustrated in FIG. 11, the L2 switch 50 judges whether the frame is in a loop or not, and if the frame is in a loop, the frame in a loop should be discarded without updating the FDB 50a.

Here, a technique of judging whether a frame is in a loop is disclosed in, for example, Japanese Patent Laid-open number JP-A-2006-173785. In JP-A-2006-173785, a terminal moving state where packets of the same transmission source address are input to different ports is detected, and by counting a detection frequency of the terminal moving state for every port, whether the frame is in a loop or not is judged.

SUMMARY

According to an aspect of the invention, an apparatus includes: a port for transmitting and receiving a frame; a learning table for storing a transmission source address included in the frame received at the port and the port receiving the frame in association with each other; a port detector for detecting whether learning data coincident with the transmission source address included in the frame received at the port exists in the learning table; a port judging unit for comparing the port learned in the learning data detected by the port detector to the receiving port; and a loop judging unit for judging, on the basis of a time lapse from the storage of the learning data, whether the frame is in a loop or not when the ports are not coincident with each other.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4 is a diagram illustrating an example of the data structure of FDB;

FIG. 5 is a diagram illustrating an example of the data structure of a discard target frame data buffer;

DESCRIPTION OF THE EMBODIMENTS

Figure 1:
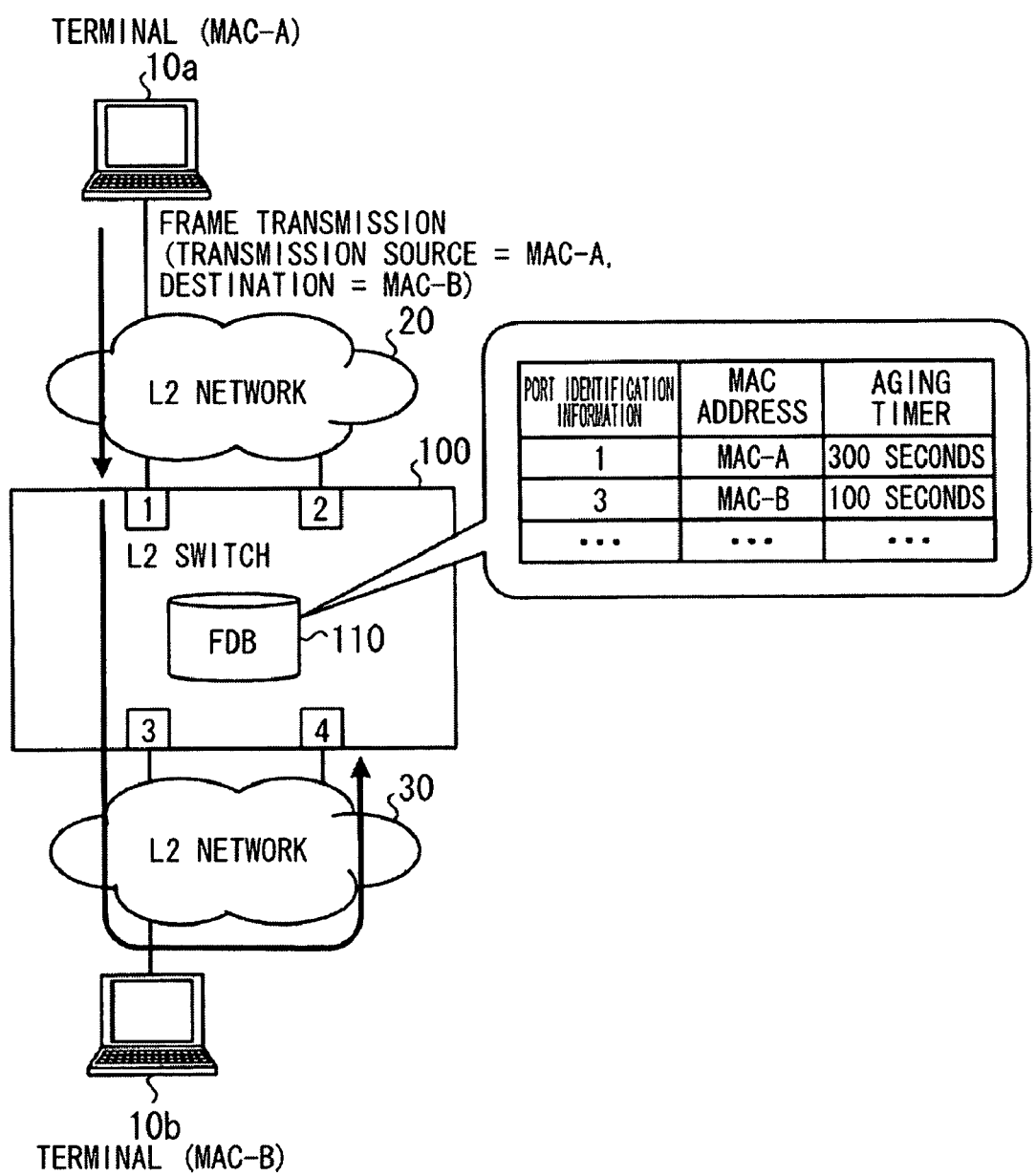
FIG. 1 is a diagram illustrating an L2 switch according to a first embodiment.

In the technique described in JP-A-2006-173785, whether a loop occurs or not is detected by detecting a terminal moving state, and thus it takes a long time to detect an occurrence of the loop.

The L2 switch processes a vast number of frames in a short time. Therefore, when the time required to detect occurrence of a loop is long, the load imposed on the L2 switch is larger, and also there is a risk that many frames cannot be properly transmitted to the transmission destination.

This embodiment addresses the problem described above. A frame transmission device and a loop judging method according to the present invention can detect an occurrence of a loop quickly.

A frame transmission device includes a plurality of ports each of which transmits/receives a frame; a frame transmission unit for transmitting the received frame to a transmission destination; a learning table for storing a transmission source address included in the frame received at the port in association with the receiving port; a port detector for detecting whether learning data coincident with the transmission source address included in the frame received by the port is stored in the learning table; a port judging unit for judging whether the port learned in the learning data detected by the port detector is coincident with the receiving port; and a loop judging unit for judging whether the frame is in a loop or not on the basis of a time lapse from the storage of the learning data when the port learned in the learning data is not coincident with the receiving port as a judgment result of the port judging unit.

When the time lapse is less than a given value, the loop judging unit judges that the frame is in a loop, and thus discards the frame.

Furthermore, the frame transmission device further includes a discard table storage unit for storing a transmission source address corresponding to a frame, ID information of the port receiving the frame, and a discard time of the frame when the frame is discarded by the loop judging unit; and a discard judging unit for searching the discard table storage and for judging whether the frame should be discarded or not based on the transmission source address of the received frame and the port that received the frame.

The frame transmission device further includes a loop eliminating judging unit for detecting a transmission source address in which a transmission source address stored in the learning table is coincident with a transmission source address stored in the discard table; and for judging, on the basis of a storage time, that the detected transmission source address was stored in the discard table storage unit and, on the basis of a storage time, that the transmission source address was stored in the learning table, whether the loop of the frame is eliminated or not.

Furthermore, a loop judging method for a frame transmission device having a plurality of ports which transmits/receives a frame and transmitting the received frame to a transmission destination, includes: a learning step of storing, in a learning table, a first transmission source address representing a transmission source address included in a first frame and a first reception port representing a port receiving the first frame so that the first transmission source address and the first reception port are associated with each other when the frame transmission device receives the first frame; a port judging step of detecting, from the learning table, a first transmission source address coincident with a second transmission source address representing a transmission source address included in a second frame when the second frame is received, and judging whether the first reception port corresponding to the detected first transmission source address and the second reception port representing the port representing the second frame are coincident with each other; and a loop judging step of judging, on the basis of a time lapse from the storage of the first reception port in the learning table in the learning table storing step, whether the second frame is in a loop when the first reception port and the second reception port are not coincident with each other.

According to the frame transmission device, when a frame is received, it is judged in the learning table whether the transmission source address has already been learned at another port. If the transmission source address has already been learned, the value of the aging timer set at the transmission source MAC address is checked to judge occurrence or non-occurrence of a loop, so that the occurrence of the loop can be quickly detected (whether the loop of the frame occurs or not can be judged without detecting the state of the terminal device connected to the network).

Furthermore, according to the frame transmission device, if a time elapsing from the time when the port receiving the frame is stored in the learning table is less than a given value, it is judged that the received frame is further looped from a different port, and thus the frame is discarded. Therefore, the frame in a loop can be efficiently detected and discarded.

According to the frame transmission device, when a frame is discarded, the transmission source address corresponding to the frame, the port receiving the frame, and the time at which the frame is discarded are stored in the discard table. On the other hand, when a frame is received, whether the frame should be discarded or not is judged on the basis of the transmission source address of the received frame, the port receiving the frame, and the discard table. Therefore, the frame in a loop can be efficiently detected and discarded.

Furthermore, according to the frame transmission device, since a transmission source address in which the transmission source address stored in the learning table and the transmission source address stored in the storage unit are coincident with each other is detected by the frame transmission device, and since whether the loop of the frame is eliminated or not is judged on the basis of the time at which the detected transmission source address is stored in the discard table storage unit and the time at which the transmission source address is stored in the learning table, the frame transmission device can properly judge whether the loop is eliminated or not, and thus a frame whose loop is eliminated can be prevented from being erroneously discarded.

Embodiments of a frame transmission device and a loop judging method will be described in detail with reference to the accompanying drawings.

First Embodiment

Figure 2:
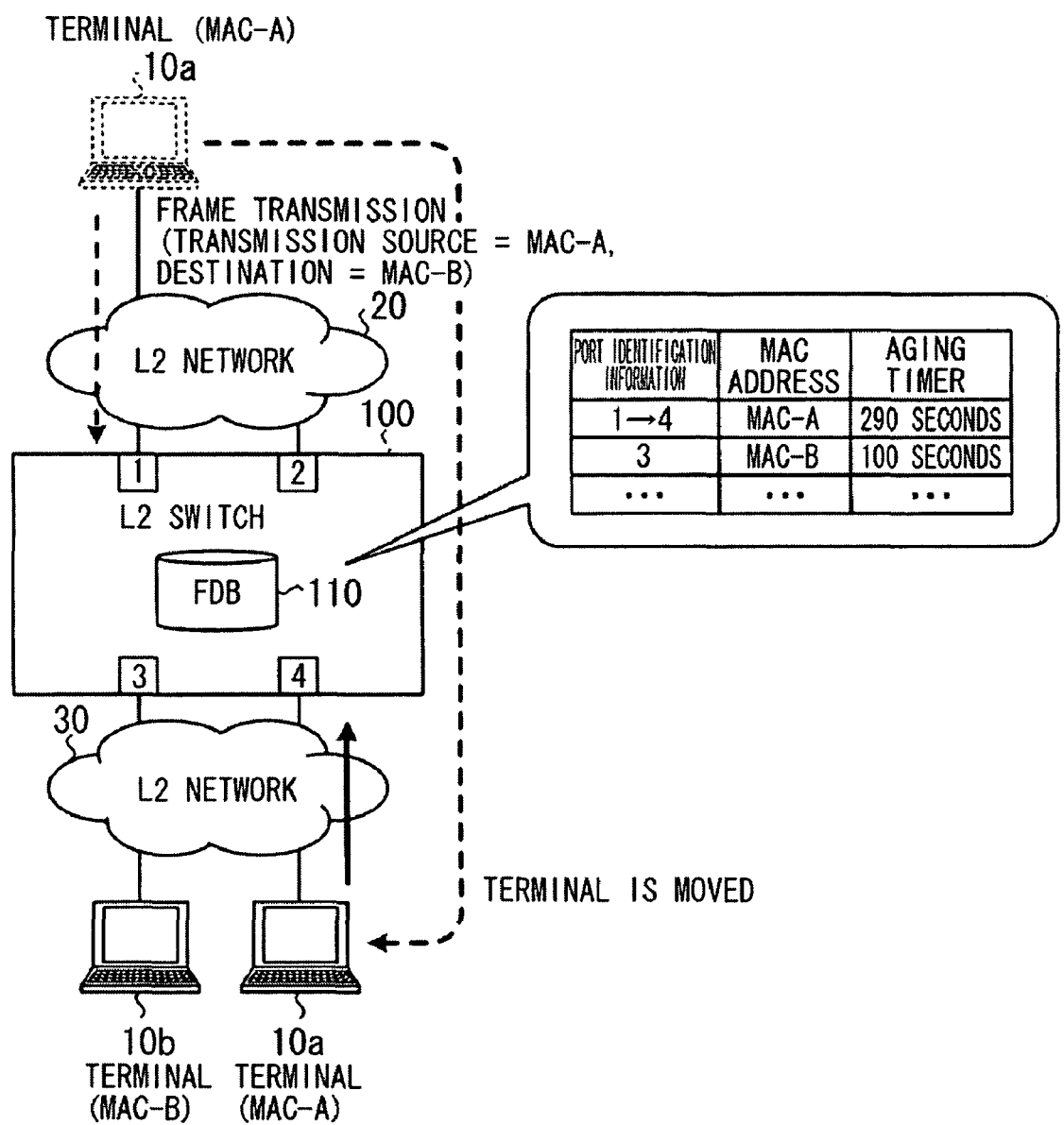
FIG. 2 is a diagram illustrating the L2 switch according to the first embodiment.

First, the general outline and features of an L2 switch (frame transmission device) according to a first embodiment will be described. FIGS. 1 and 2 are diagrams illustrating the general outline and features of the L2 switch according to the first embodiment. As illustrated in FIGS. 1 and 2, an L2 switch 100 has ports 1 to 4 and an FDB 110. Ports 1 and 2 are connected to an L2 network 20, and ports 3 and 4 are connected to an L2 network 30. The port identification information of the ports 1 to 4 are represented by "1" to "4", respectively.

Furthermore, a terminal 10a (the MAC address of the terminal 10a is represented by "MAC-A") is connected to the L2 network 20, and a terminal 10b (the MAC address of the terminal 10b is represented by "MAC-B") is connected to the L2 network 30 (in the case of FIG. 1).

The L2 switch 100 is a device for transferring a frame. On the basis of the FDB 110, the L2 switch 100 receives a frame from each of the ports 1 to 4 and stores various kinds of information of the received frames (port identification information, the MAC address of the transmission source, the aging timer) in the FDB 110 when the received frame is not in a loop.

First, the processing of transmitting a frame on the basis of information stored in the FDB 110 by the L2 switch 100 will be described. For example, port identification information "1" and the MAC address "MAC-A" are stored in association with each other in the FDB 110. Therefore, when a frame in which the MAC address of the transmission source is "MAC-A" is received from the L2 network 20 or 30, the L2 switch 100 transmits the received frame from the port 1.

Furthermore, port identification information "3" and the MAC address "MAC-B" are stored in association with each other in the FDB 110. Therefore, when a frame in which the MAC address of the transmission source is "MAC-B" is received from the L2 network 20 or 30, the L2 switch 100 transmits the received frame from the port 3.

Next, the processing of judging whether a frame is in a loop or not (the processing of updating information stored in FDB 110) by the L2 switch 100 will be described. When the L2 switch 100 receives a frame from any one of the ports 1 to 4, the L2 switch 100 judges whether the frame is in a loop or not on the basis of the MAC address of the transmission source included in the received frame, the port receiving the frame, and the information stored in the FDB 110.

Here, for convenience of description, the L2 switch 100 will be described where the MAC address stored in FDB 110 is defined as a first MAC address, and the MAC address of the transmission source of the frame received from L2 network 30 is defined as a second MAC address.

The L2 switch 100 detects the first MAC address coincident with the second MAC address of the received frame from the FDB 110, and judges whether the port identification information corresponding to the detected first MAC address (hereinafter referred to as the first port identification information) is coincident with the port identification information of a port which receives the frame (the frame having the second MAC address as the transmission source) (hereinafter referred to as second port identification information).

When the first port identification information is coincident with the second port identification information, the L2 switch 100 sets the aging timer corresponding to an entry of the first port identification information to a maximum value (for example, 300 seconds), and finishes the processing.

On the other hand, when the first port identification information is different from the second port identification information, the L2 switch 100 judges whether the frame is in a loop or not on the basis of the aging timer corresponding to the first port identification information. Specifically, when the value of the aging timer is not less than a given value (for example, 299 seconds), it is judged that the frame is in a loop, and thus the L2 switch 100 discards the frame. That is, the frame is discarded when the lapse time is equal to or less than a value (one second) obtained by subtracting the given value (299 seconds) from the maximum value (300 seconds).

For example, as illustrated in FIG. 1, when a frame including the MAC address of the transmission source "MAC-A" is received from the port 4 (the second port identification information "4"), the L2 switch 100 obtains the first MAC address "MAC-A" corresponding to the second MAC address "MAC-A" from the FDB 110, and judges whether or not the first port identification information "1" is equal to the second port identification information "3".

Here, the first port identification information "1" and the second port identification information "3" are different form each other. Accordingly, when it is judged on the basis of the aging timer corresponding to the first port identification information whether the frame is in a loop or not, the value of the aging timer is equal to the given value or more, and thus the L2 switch 100 regards the frame received from the port 4 as in a loop, thereby discarding the frame.

On the other hand, when the value of the aging timer is less than the given value, the L2 switch 100 assumes that the frame is not in a loop, but that the terminal 10a has moved, and thus updates the first port identification information to the second port identification information.

For example, as illustrated in FIG. 2, when a frame including the MAC address "MAC-A" of the transmission source is received from the port 4 (the second port identification information "4"), the L2 switch 100 obtains the first MAC address "MAC-A" corresponding to the second MAC address "MAC-A" from the FDB 110, and judges whether the first port identification information "1" is equal to the second port identification information "3".

Here, the first port identification information "1" is different from the second port identification information "3". Accordingly, when it is judged on the basis of the aging timer corresponding to the first port identification information whether the frame is in a loop or not, the value of the aging timer is less than the given value (for example, 299 seconds), and thus the L2 switch 100 assumes that the frame received from the port 4 is not in a loop, and thus updates the port identification information of the FDB 110 from "1" to "4". That is, the lapse time is equal to or more than the value (one second) obtained by subtracting the given value (299 seconds) from the maximum value (300 seconds), and thus the L2 switch 100 updates the port identification information of the FDB 110.

As described above, when a frame is received, the L2 switch 100 judges whether or not the corresponding transmission source address has already been learned at another port, and if it has already been learned, the L2 switch 100 checks the value of the aging timer set in the corresponding transmission source MAC address to judge the occurrence or non-occurrence of a loop, so that the occurrence of a loop can be quickly detected.

When a user moves a terminal, the steps of stopping frame transmission, disconnecting from a network before the terminal is moved, moving the terminal, connecting to a network after the terminal is moved, and restarting frame transmission are executed, and thus it is estimated that the user may take a certain time or longer until the L2 switch 100 receives a frame from another port.

On the other hand, the time from occurrence of a loop on the L2 network 20 or 30 till reception of a frame from another port is substantially equal to 0 seconds. Accordingly, when an MAC-learned frame is received at another port, by judging the value of the aging timer, it can be judged whether the terminal has moved or whether a loop occurs on the L2 network 20 or 30.

Figure 3:
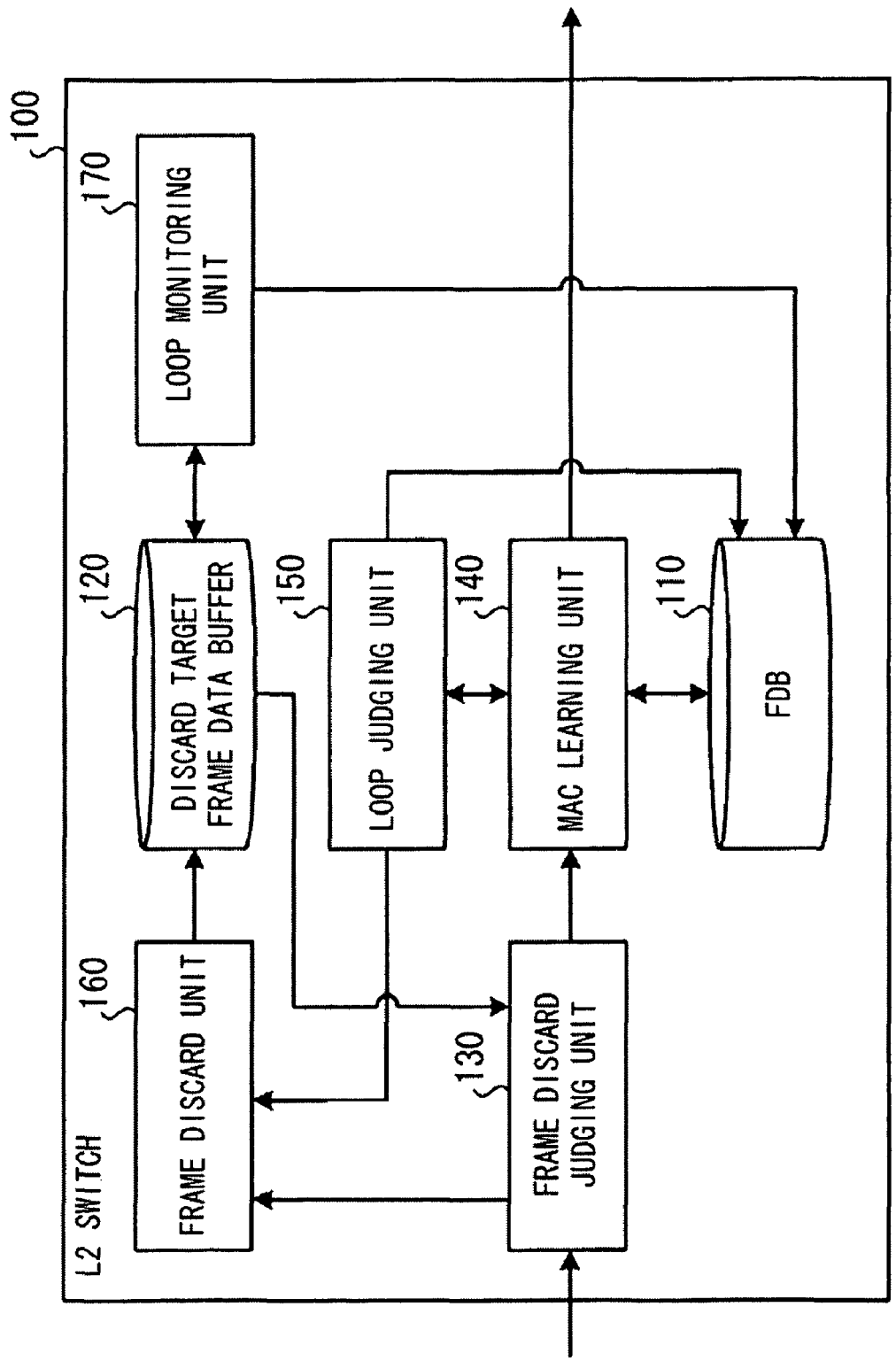
FIG. 3 is a functional block diagram illustrating the L2 switch according to the first embodiment.

Next, the L2 switch illustrated in FIGS. 1 and 2 will be described in more detail. FIG. 3 is a functional block diagram illustrating the L2 switch according to the first embodiment. As illustrated in FIGS. 1 and 2, the L2 switch 100 has an FDB 110, discard target frame data buffer 120, a frame discard judging unit 130, an MAC learning unit 140, a loop judging unit 150, a frame discard unit 160, and a loop monitoring unit 170. Other configurations of the L2 switch 100 are the same as well-known L2 switches, and thus the descriptions thereof are omitted.

Figure 4:
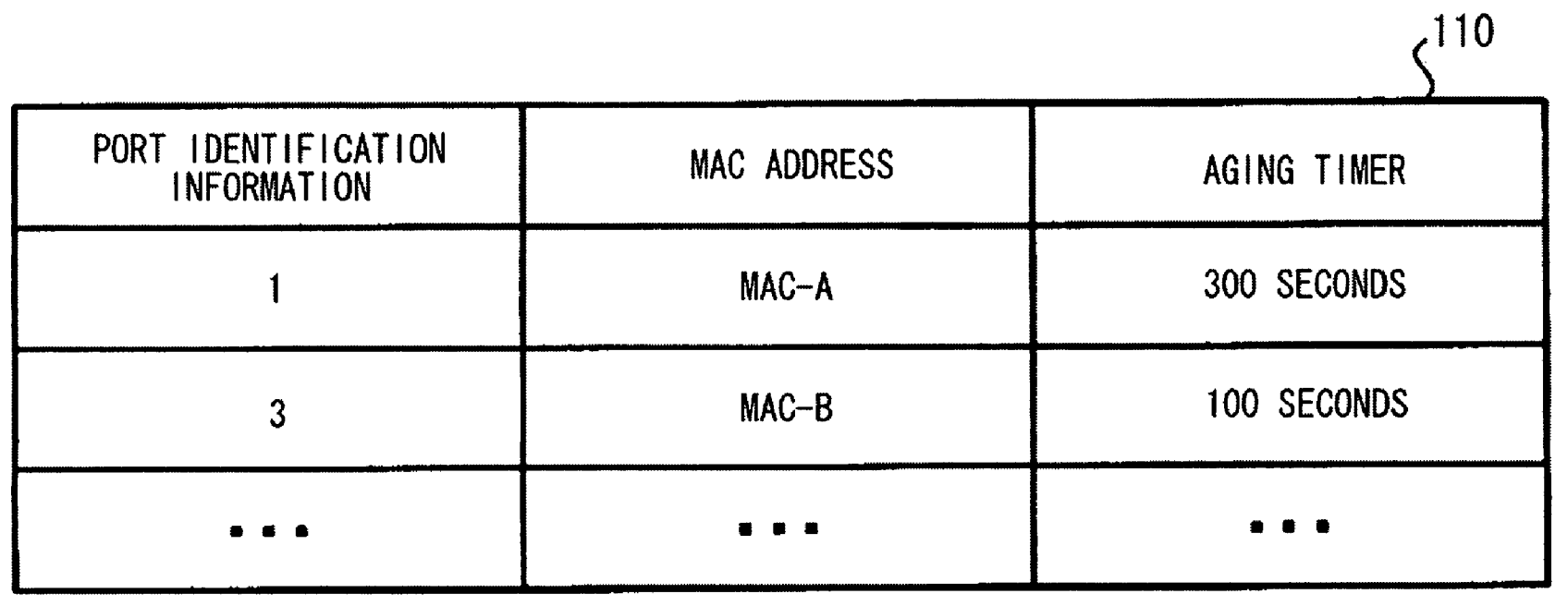

Here, the FDB 110 is a storage unit for storing, in association with each other, port identification information (corresponding to the first port identification information), a MAC address (corresponding to the first MAC address), and an aging timer. FIG. 4 is a diagram illustrating an example of the data structure of FDB 110.

In the first row of FIG. 4, the MAC address "MAC-A" is associated with the port identification information "1", and the aging timer is set to "300 seconds". In the second row, the MAC address "MAC-B" is associated with the port identification information "3", and the aging timer is set to "100 seconds".

The discard target frame data buffer 120 stores the port identification information of a frame as a discard target, a MAC address, and a frame discard time at which the frame is discarded so that the port identification information, the MAC address, and the frame discard time are associated with one another. FIG. 5 is a diagram illustrating an example of the data structure of the discard target frame data buffer 120.

In the example of FIG. 5, the discard target frame data buffer 120 stores, in association with one another, the port identification information "4", the MAC address "MAC-A", and the frame discard time "10 hour 00 minute 00 second". For example, when the L2 switch 100 receives a frame having the MAC address "MAC-A" of the transmission source from the port "4" in the state that the discard target frame data buffer 120 stores the information illustrated in FIG. 5, the frame is discarded.

When the L2 switch 100 receives a frame, the frame discard judging unit 130 refers to the discard target frame data buffer 120 (see FIG. 5) to judge whether information coincident with the port identification information (the second port identification information), and the MAC address (second MAC address) of the received frame is registered in the discard target frame data buffer 120.

When the second port identification information and the second MAC address of the frame are registered in the discard target frame data buffer 120, the frame discard judging unit 130 outputs the received frame to the frame discard unit 160. On the other hand, when the second port identification information and the second MAC address of the frame are not registered in the discard target frame data buffer 120, the frame discard judging unit 130 outputs the received frame to the MAC learning unit 140.

The MAC learning unit 140 compares the second port identification information and the second MAC address of the frame (the frame obtained from the frame discard judging unit 130) with the FDB 110, and judges whether the transmission source MAC address of the frame has already been learned.

Specifically, when the first MAC address coincident with the second MAC address is not registered in the FDB 110, the MAC learning unit 140 associates the second MAC address with the second port identification information and registers the second MAC address and the second port identification information in the FDB 110. Furthermore, the corresponding aging timer is set to a maximum value (for example, 300 seconds).

On the other hand, the MAC learning unit 140 outputs the frame to the loop judging unit 150 when the first MAC address coincident with the second MAC address exists in the FDB 110 and the first port identification information associated with the first MAC address is not coincident with the second port identification information.

The MAC learning unit 140 sets the corresponding aging timer to a maximum value when the first MAC address coincident with the second MAC address exists in the FDB 110 and the first port identification information associated with the first MAC address is coincident with the second port identification information. The MAC learning unit 140 outputs the frame to the corresponding port (not shown) on the basis of the FDB 110.

The loop judging unit 150 judges whether the frame is in a loop or not. Specifically, when the loop judging unit 150 obtains a frame from the MAC learning unit 140, the loop judging unit 150 obtains the aging timer corresponding to the second MAC address of the frame, and compares the value of the aging timer with a given value (for example, 299 seconds) to judge whether the frame is in a loop or not.

If the value of the aging timer is equal to or more than a given value, the loop judging unit 150 judges that the frame is in a loop, and thus outputs the frame to the frame discard unit 160. On the other hand, if the value of the aging timer is less than the given value, the loop judging unit 150 judges that the frame is not in a loop.

When receiving a frame from the frame discard judging unit 130 or the loop judging unit 150, the frame discard unit 160 discards the frame.

When obtaining the frame from the frame discard judging unit 130, the frame discard unit 160 discards the obtained frame, and updates the frame discard time of the discard target frame data buffer 120. For example, when the frame discard unit 160 discards a frame having "MAC-A" as the MAC address of the transmission source (the port identification information is set to "4") at "10 hour 00 minute 00 second", the frame discard time corresponding to the port identification information "4" and the MAC address "MAC-A" are updated to "10 hour 00 minute 00 second".

When receiving the frame from the loop judging unit 150, the frame discard unit 160 discards the received frame, and registers "port identification information", "MAC address", and "time at which frame is discarded (frame discard time)" of the discarded frame in association with one another in the discard target frame data buffer 120.

The loop monitoring unit 170 monitors the information registered in the discard target frame data buffer 120 and the FDB 110 at certain periods, and judges whether the loop of the frame is eliminated or not. Specifically, when the loop monitoring unit 170 receives a frame (a frame which is judged not to be in a loop) having the same transmission source MAC address as the discarded frame at the same time as the discard time or after, the loop monitoring unit 170 judges that the loop of the frame as the discard target is eliminated.

Figure 6:
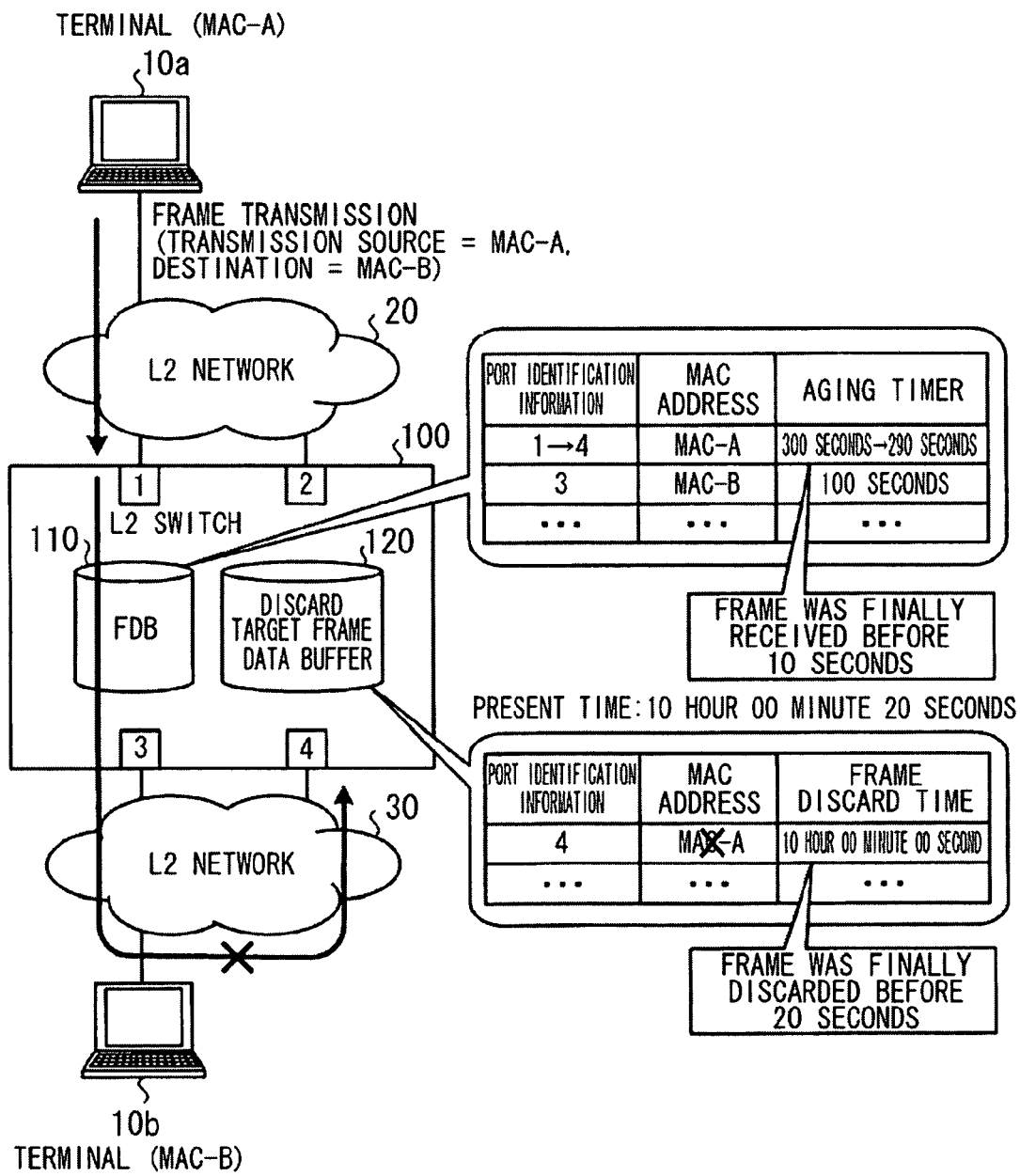
FIG. 6 is a diagram illustrating the processing of a loop monitoring unit.

FIG. 6 is a diagram illustrating the processing of the loop monitoring unit 170. As illustrated in FIG. 6, when a time lapse from the time when the frame of the port identification information "4", the MAC address "MAC-A", and the frame discard time "10 hour 00 minute 00 second" are discarded is longer than a time lapse from the time when the frame of the port identification information "1", the MAC address "MAC-A", and the aging timer "290 seconds" are received, the loop monitoring unit 170 judges that the loop of the frame having the transmission source MAC address "MAC-A" is eliminated.

This is because when the loop of the frame is eliminated and the discard target frame is not received at the port "4" (the port corresponding to the port identification information "4"), the frame discard time is not updated, a frame which is not in a loop is received from the port "1", and the value of the aging timer is updated.

In the example illustrated in FIG. 6, when the present time is set to "10 hour 00 minute 20 second", the time at which the non-looped frame (the transmission source MAC address "MAC-A") is received from the port identification information "1" is equal to "10 hour 00 minute 10 seconds", and thus the entry recorded in the first row of the discard target frame data buffer 120 is deleted.

That is, the loop monitoring unit 170 judges that the loop is eliminated when the condition of "present time–frame discard time>maximum value of aging timer–value of present aging timer" is satisfied.

Figure 7:
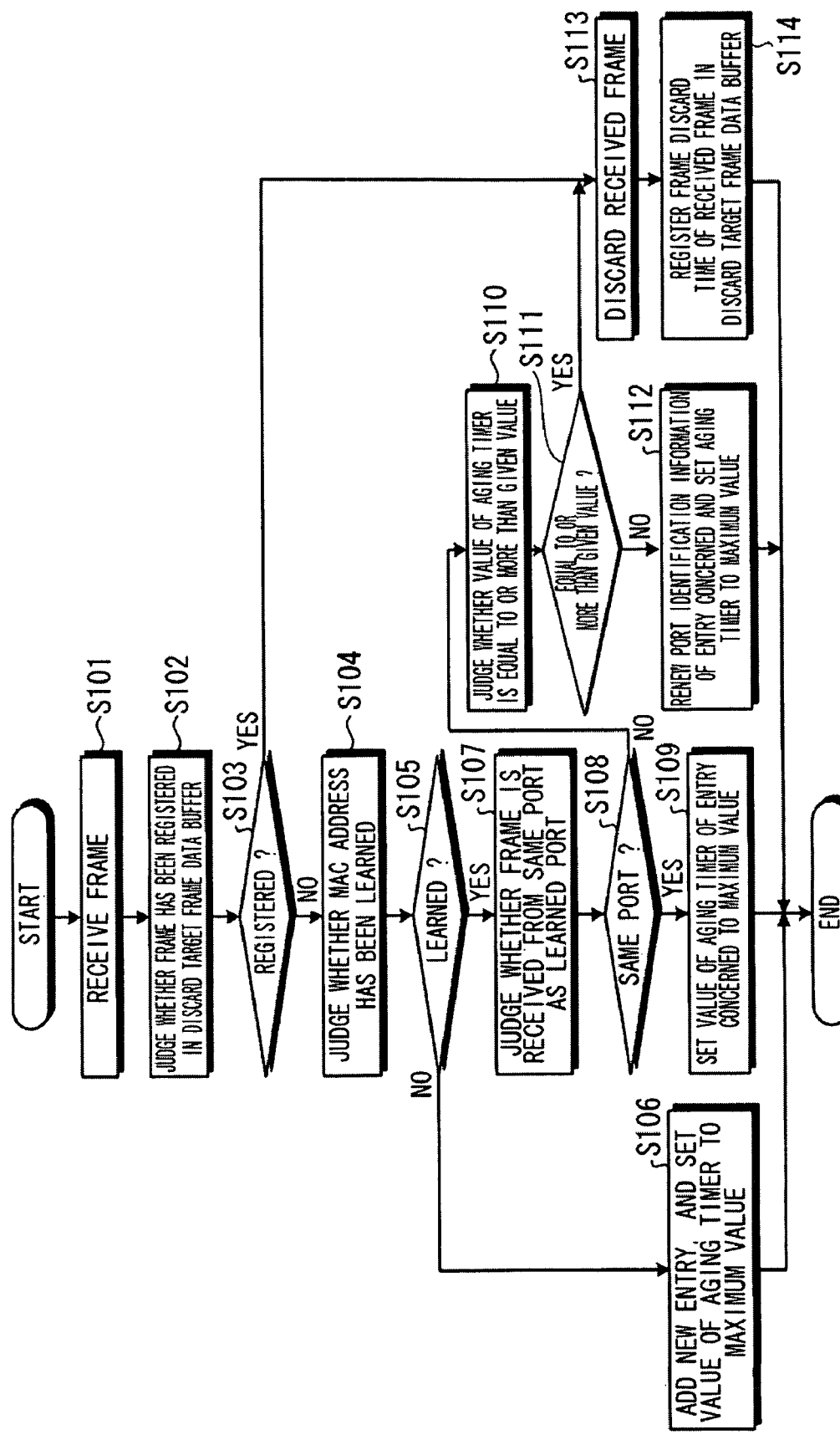
FIG. 7 is a flowchart illustrating frame processing executed by the L2 switch.
Figure 8:
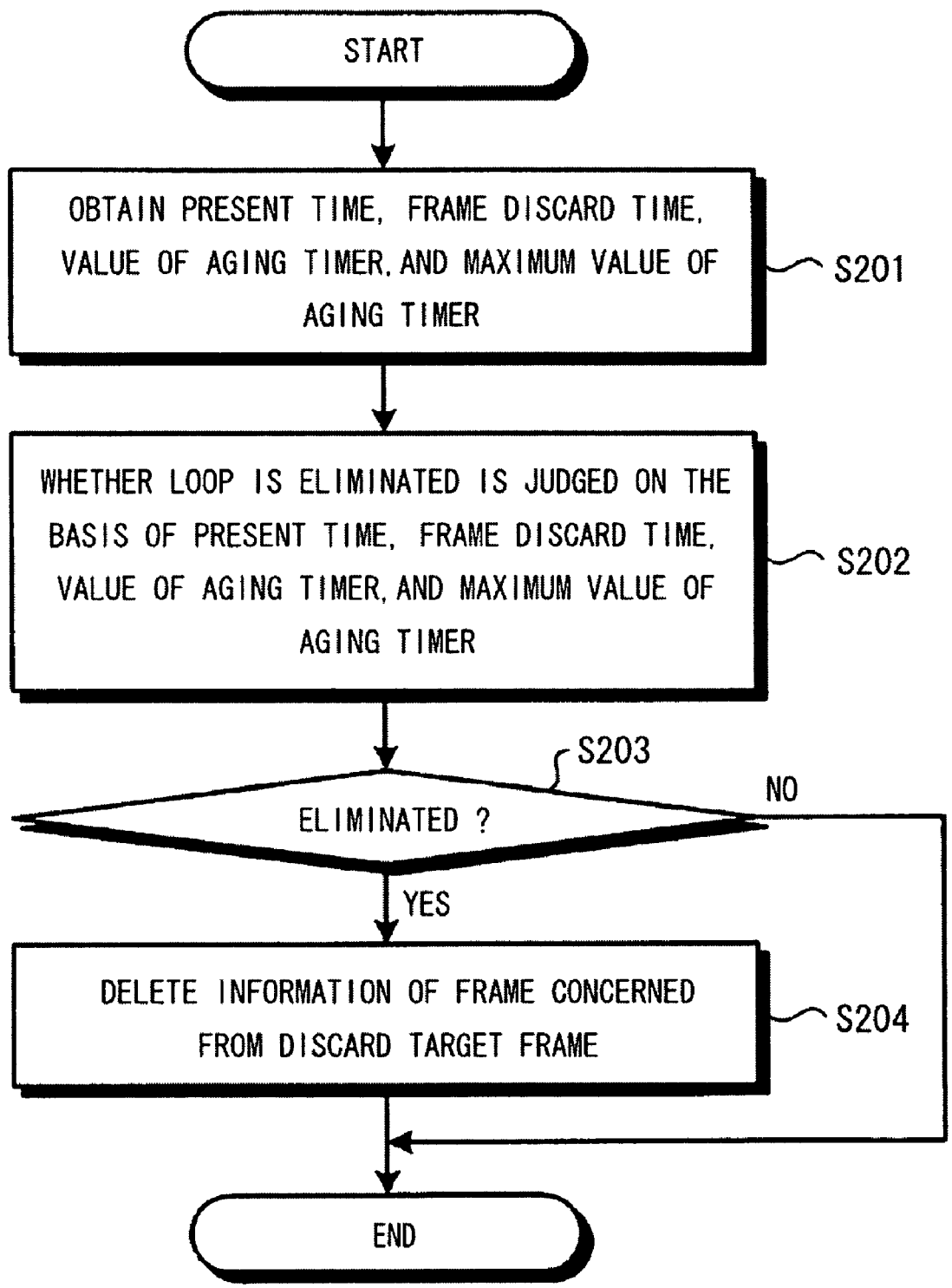
FIG. 8 is a flowchart illustrating loop eliminating judging processing executed by the L2 switch.

Next, the processing flow of the L2 switch 100 according to the first embodiment will be described. FIG. 7 is a flowchart illustrating the frame processing executed by the L2 switch 100, and FIG. 8 is a flowchart illustrating the loop eliminating judging processing executed by the L2 switch 100.

The frame processing executed by the L2 switch 100 will be described. As illustrated in FIG. 7, the L2 switch 100 receives a frame (operation S101), and judges whether the received frame has already been registered in the discard target frame data buffer 120 (operation S102). If it has already been registered (operation S103; Yes), the processing goes to operation S113.

On the other hand, if the received frame has not yet been registered in the discard target frame data buffer 120 (operation S103; No), whether the MAC address has already been learned or not is judged (operation S104). If the MAC address has not yet been learned (operation S105; No), a new entry is registered in the FDB 110, the value of the aging timer is set to a maximum value (operation S106), and then the processing is finished.

When the MAC address has already been learned (operation S105; Yes), whether the frame is received from the same port as the learned port is judged (operation S107). When the frame is received from the same port (operation S108; Yes), the value of the aging timer of the entry is set to a maximum value (operation S109), and then the processing is finished.

On the other hand, when the frame is not received from the same port (operation S108; No), whether the value of the aging timer is equal to or more than a given value (operation S110) is judged. If the value is less than the given value (operation S111; No), the port identification information of the entry is updated, the aging timer is set to a maximum value (operation S112), and then the processing is finished.

On the other hand, when the value of the aging timer is equal to or more than a given value (operation S111; Yes), the received frame is discarded (operation S113), the frame discard time of the received frame is registered in the discard target frame data buffer 120 (operation S114), and then the processing is finished.

Next, the loop eliminating judging processing executed by the L2 switch 100 will be described. As illustrated in FIG. 8, the L2 switch 100 judges whether the loop monitoring unit 170 obtains the present time, the frame discard time, the value of the aging timer, and the maximum value of the aging timer (operation S201); and judges whether the loop is eliminated or not on the basis of the present time, the frame discard time, the value of the aging timer, and the maximum value of the aging timer (operation S202).

When the loop monitoring unit 170 judges that the loop is not eliminated (operation S203; No), the loop monitoring unit 170 finishes the processing. On the other hand, when the loop monitoring unit 170 judges that the loop is eliminated (operation S203; Yes), the information of the frame is deleted from the discard target frame data (operation S204), and then the processing is finished. The processing illustrated in FIG. 8 may be executed at certain times, for example.

As described above, in the L2 switch 100 according to the first embodiment, at the frame reception time, the loop judging unit 150 judges whether the corresponding transmission source address has already been learned at another port, and if the corresponding transmission source address has already been learned, the loop judging unit 150 checks the value of the aging timer to judge occurrence or non-occurrence of a loop. Therefore, occurrence of the loop can be quickly detected (occurrence of the loop of a frame can be judged without detecting the state of the terminal 10a or 10b connected to the L2 network 20 or 30 as in the case of well-known techniques).

Second Embodiment

The first embodiment is described above, however, various different embodiments may be executed. In the following description, another embodiment will be described as a second embodiment.

(1) Regarding the Value of the Aging Timer as a Criterion of Judgment as to Occurrence of Loop For example, in the first embodiment, the loop judging unit 150 compares the value of the aging timer with a given value (for example, 299 seconds) to judge whether the loop occurs or not. However, the present invention is not limited to this embodiment. A manager, for example, of the L2 switch 100 may freely set the given value as a comparison target.

(2) Regarding Discard of Frame

For example, in the first embodiment, the frame discard unit 160 discards a frame on the basis of the judgment result of the frame discard judging unit 130. However, in place of discard of a frame, an event notification message may be transmitted to the network manager to notify occurrence of a loop.

That is, when the frame discard judging unit 130 discards a frame, the frame discard unit 160 may discard the frame as a discard target and also transmit an event notification message to the network manager, or may transmit a frame as a discard target to a destination without discarding the frame and transmit a event notification message to network manager.

As described above, by transmitting only the event notification message to the network manager for even a frame as a discard target without discarding the frame, the problem of lost data can be reduced if not solved even when the frame as the discard target includes important data.

(3) Regarding Processing of Judging Elimination of Loop

For example, in the first embodiment, the loop monitoring unit 170 judges that the loop is eliminated when the condition "present time−frame discard time>maximum value of aging timer−present value of aging timer" is satisfied; however, the present invention is not limited to this embodiment. Even when the above relational expression is not satisfied, at a time when a fixed time elapses after final frame discard, the information of the frame may be deleted from the discard target frame data (it may be judged that the loop is eliminated). The timing at which the judgment is executed may be freely set by the manager of the system.

(4) Configuration of System, etc.

In the above embodiment, all or a part of the processing which is described as automatically executed may be manually executed. Or, all or a part of the processing which is described as manually executed may be automatically executed by well-known methods. In addition, the processing flow, the control flow, the specific titles, and information including the various kinds of data and parameters may be arbitrarily changed unless specifically described.

Each element of the L2 switch 100 illustrated in FIG. 3 is functionally conceptual, and thus the illustrated elements are not necessarily identical to corresponding physical elements. That is, a specific style of dispersion or integration of respective devices is not limited to the illustrated ones, and all or some of the devices may be functionally or physically dispersed or integrated in any unit basis in accordance with each kind of load or use status. Furthermore, the whole or a part of each processing function executed in each device may be implemented by a CPU and/or a program which is analyzed and executed by the CPU, or may be implemented by hardware based on wired logic.

Figure 9:
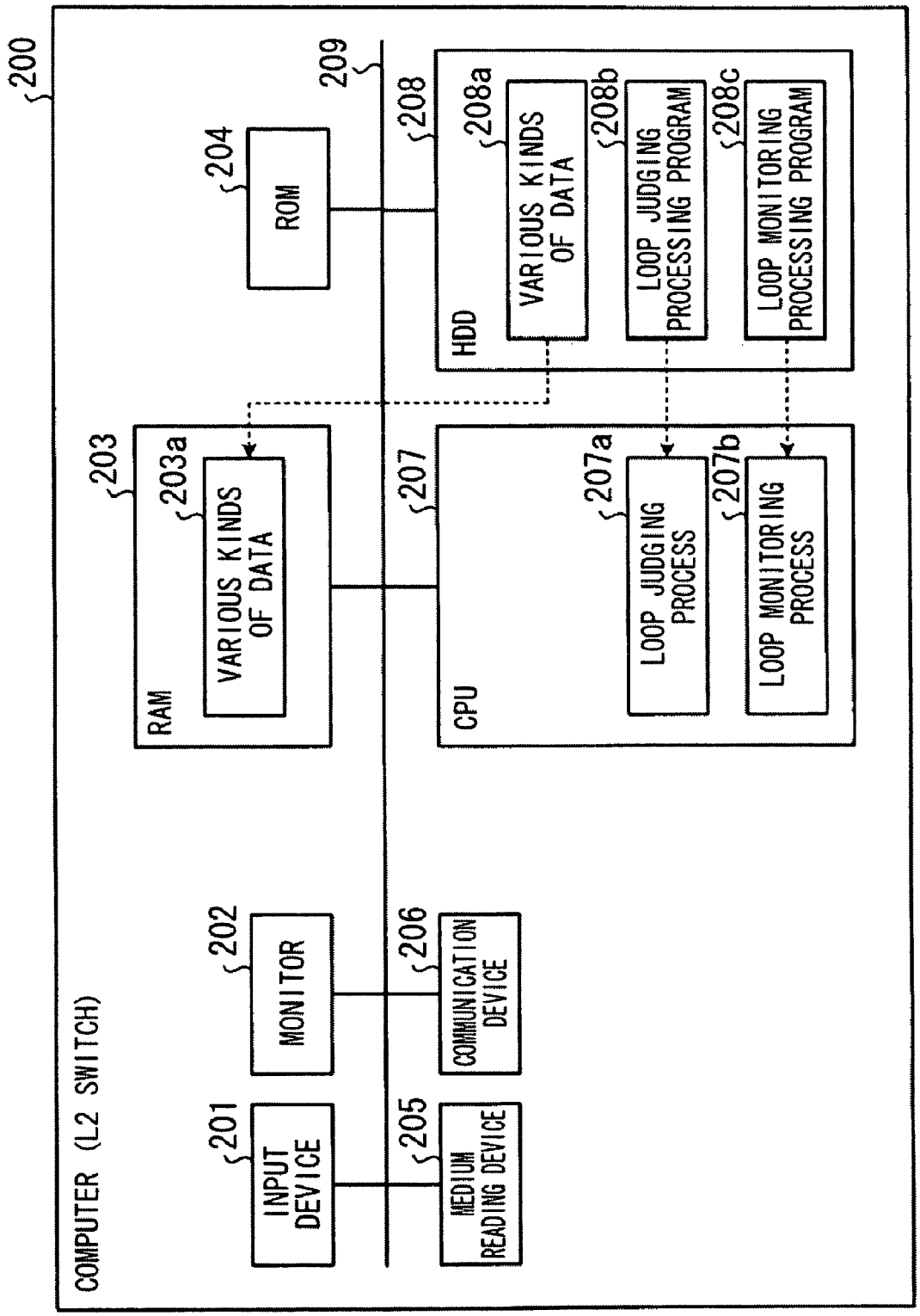
FIG. 9 is a diagram illustrating hardware when the first embodiment is implemented by a computer.
Figure 10:
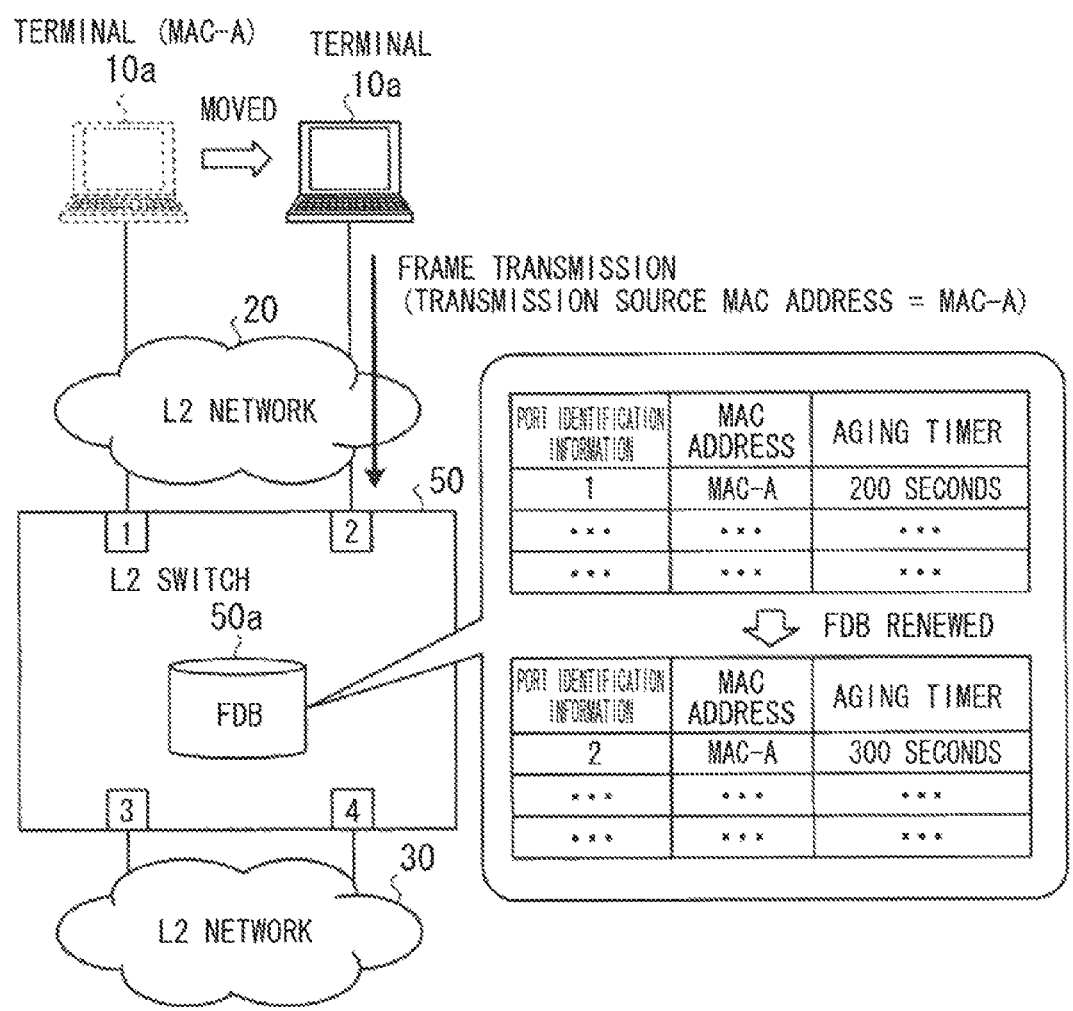
FIG. 10 is a diagram illustrating a MAC learning function in the L2 switch.
Figure 11:
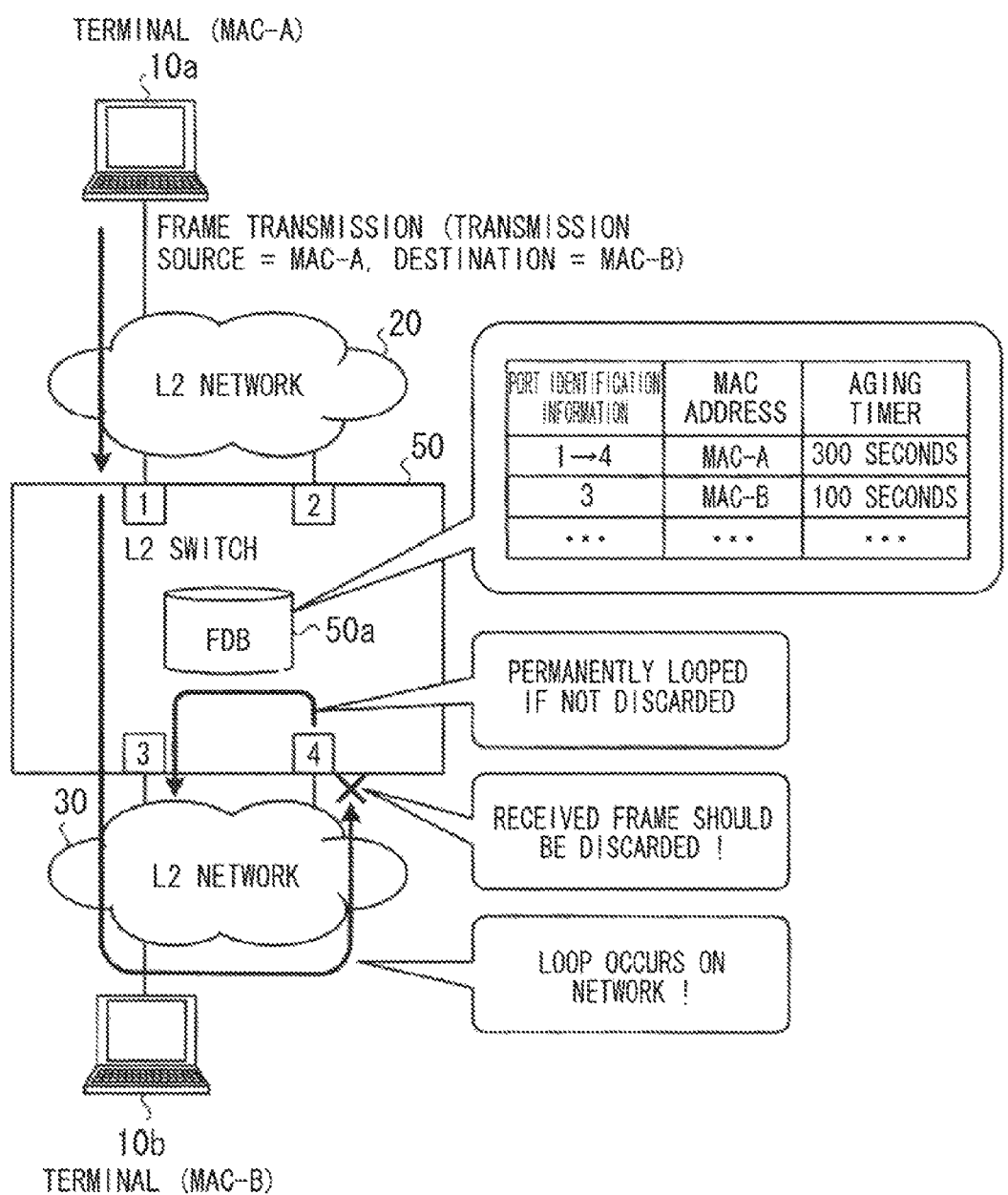
FIG. 11 is a diagram illustrating a problem caused by looping of a frame.

FIG. 9 is a diagram illustrating hardware in which the L2 switch 100 according to the first embodiment is implemented by a computer 200. As illustrated in FIG. 9, the computer (L2 switch) 200 includes an input device 201, a monitor 202, a Ram (Random Access Memory) 203, a ROM (Read Only Memory) 204, a medium reading device 205 for reading out data from a storage medium, a communication device 206 for transmitting/receiving data to/from another device, a CPU (Central Processing Unit) 207, and a HDD (Hard Disk Drive) 208 which are connected to one another through a bus 209.

A loop judging processing program 208b having the same function as the L2 switch 100 described above, and a loop monitoring processing program 208c are stored in the HDD 208. The CPU 207 reads and executes the loop judging processing program 208b and the loop monitoring processing program 208c, whereby the loop judging process 207a and the loop monitoring process 207b are started. Here, the loop judging process 207a corresponds to the processes of the frame discard judging unit 130, the MAC learning unit 140, the loop judging unit 150, and the frame discard unit 160 illustrated in FIG. 3, and the loop monitoring process 207b corresponds to the processes of the loop monitoring unit 170 illustrated in FIG. 3.

Furthermore, HDD 208 stores various kinds of data 208a corresponding to the data of the FDB 110 and the discard target frame data buffer 120. CPU 207 reads out various kinds of data 208a stored in the HDD 208, stores the data 208a in the RAM 203, registers various kinds of information of the frame into the various kinds of data 203a stored in the RAM 203, and then judges whether the frame is in a loop.

The loop judging processing program 208b and the loop monitoring processing program 208c illustrated in FIG. 9 are not necessarily required to be stored in the HDD 208 from the beginning. For example, the loop judging processing program 208b and the loop monitoring processing program 208c may be stored in a portable physical medium such as a flexible disk (FD), CD-ROM, a DVD disc, a magneto-optical disc, an IC card or the like inserted in a computer, a fixed physical medium provided outside or inside a computer such as a hard disc drive (HDD) or the like, or another computer (or server) connected to a computer through a public line, the Internet, LAN, WAN or the like so that the computer reads out and executes the loop judging processing program 208b and the loop monitoring processing program 208c.

As described above, the frame transmission device and the loop judging method according to the present invention are effectively used for a transmission system for executing frame transmission, and they are particularly suitably used in a case where it is required to efficiently detect a looped frame and discard the detected looped frame.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A frame transmission device having a port to transmit and receive a frame and a learning table to store a transmission source address included in the frame received at the port and the receiving port in association with each other, comprising:

a port detector to detect whether learning data coincident with the transmission source address included in the frame received at the port is stored in the learning table;

a port judging unit to compare a port learned in the learning data and detected by the port detector to the receiving port;

a loop judging unit to judge on a basis of a time lapse from the storage of the learning data whether the frame is in a loop or not when the port learned in the learning data is not coincident with the receiving port as a comparison result of the port judging unit, wherein when the time lapse is less than a given value, the loop judging unit judges that the frame is in a loop, and discards the frame a discard table storage unit to store a transmission source address corresponding to a frame, ID information of the port receiving the frame, and a time at which the frame is discarded by the loop judging unit; and a discard judging unit to judge on the basis of the transmission source address of the received frame, the port receiving the frame, and the discard table whether the frame should be discarded; and a loop eliminating judging unit to detect a transmission source address in which a transmission source address stored in the learning table is coincident with a transmission source address stored in the discard table, and judging whether the loop of the frame is eliminated, on the basis of a time at which the detected transmission source address is stored in the discard table and a time at which the transmission source address is stored in the learning table.

2. A loop judging method of a frame transmission device which has a plurality of ports for transmitting and receiving a frame and which transmits the received frame to a transmission destination, comprising:

storing in a learning table a first transmission source address representing a transmission source address included in a first frame and a first receiving port representing a port receiving the first frame in association with each other when the first frame is received;

detecting from the learning table a first transmission source address coincident with a second transmission source address representing a transmission source address included in a second frame when the second frame is received, and judging whether a first reception port corresponding to the detected first transmission source address is coincident with a second reception port representing a port receiving the second frame;

judging on the basis of a time lapse from the storage of the first reception port in the learning table in the storing whether the second frame is in a loop when the first reception port and the second reception port are not coincident with each other, wherein the judging judges that the second frame is in a loop when a time elapsing from the storage of the first reception port in the learning table is less than a given value, and thus discards the second frame;

storing in a discard table a second transmission source address corresponding to a second frame, a second reception port, and a discard time of the second frame when the second frame is discarded in the judging;

judging on the basis of a transmission source address of a received frame, a port receiving the frame, and the discard table whether the frame is discarded or not when the frame is received;

detecting from the discard table a second transmission source address coincident with a first transmission source address stored in the learning table; and judging whether the loop of the second frame is eliminated or not, on the basis of a time at which the detected second transmission source address is stored in the discard table and a time at which the first transmission source address corresponding to the second transmission source address is stored in the learning table.

3. A non-transitory recording medium having a loop judging program recorded therein, the loop judging program making a computer execute:

storing in a learning table a first transmission source address representing a transmission source address included in a first frame and a first reception port representing a port receiving the first frame in association with each other when the first frame is received;

detecting a first transmission source address coincident with a second transmission source representing a transmission source address included in a second frame when the second frame is received;

judging whether a first reception port corresponding to the detected first transmission source address is coincident with a second reception port representing a port receiving the second frame;

judging on a basis of a time elapsing from the storing of the first reception port in the learning table whether the second frame is in a loop or not when the first reception port and the second reception port are not coincident with each other, wherein the judging judges that the second frame is in a loop when a time elapsing from the storing of the first reception port in the learning table is less than a given value, and thus discards the second frame;

storing in which a second transmission source address corresponding to the second frame, a second reception port, and a discard time of the second frame are stored in a discard table when the second frame is discarded;

judging on the basis of a transmission source address of a received frame, a port receiving the frame, and the discard table whether the frame is discarded or not when the frame is received; and detecting from the learning table a second transmission source address coincident with a first transmission source address stored in the learning table, and judging whether a loop of the second frame is eliminated on the basis of a time when the detected second transmission source address is stored in the discard table and a time when the first transmission source address corresponding to the second transmission source address is stored in the learning table.

* * * * *